United States Patent [19]

Schoppe et al.

[11] Patent Number: 5,317,979
[45] Date of Patent: Jun. 7, 1994

[54] METHOD AND APPARATUS FOR THE COMPLETE, DRY DESULPHURIZATION OF COMBUSTION WASTE GASES COMPRISING SO₂ AND DUST

[75] Inventors: Fritz Schoppe, Gustav-Adolf-Strasse 5, D-8192 Geretsried 2, Fed. Rep. of Germany; Josef Pröstler, Geretsried, Fed. Rep. of Germany

[73] Assignee: Fritz Schoppe, Geretsried, Fed. Rep. of Germany

[21] Appl. No.: 847,048

[22] PCT Filed: Aug. 14, 1991

[86] PCT No.: PCT/EP91/01548

§ 371 Date: Apr. 16, 1992

§ 102(e) Date: Apr. 16, 1992

[87] PCT Pub. No.: WO92/03211

PCT Pub. Date: Mar. 5, 1992

[30] Foreign Application Priority Data

Aug. 17, 1990 [DE] Fed. Rep. of Germany ..... 90115773

[51] Int. Cl.⁵ .............................................. F23B 7/00

[52] U.S. Cl. .................................. 110/234; 110/264; 110/345; 110/347

[58] Field of Search ............... 110/345, 234, 264, 347; 422/168, 173; 423/220

[56] References Cited

U.S. PATENT DOCUMENTS

| 4,057,021 | 11/1977 | Schoppe | 110/264 |
| 4,098,871 | 7/1978 | Schoppe | 423/177 |
| 5,029,535 | 7/1991 | Krigmont et al. | 110/345 |

*Primary Examiner*—Edward G. Favors
*Attorney, Agent, or Firm*—Brooks Haidt Haffner & Delahunty

[57] ABSTRACT

Combustion waste gases of coal dust comprising SO₂ and fly ash are completely and dry desulphurized by very quickly heating up the fly ash to a high temperature which, however, is below the sintering temperature of the fly ash, and cooling the combustion waste gases to a temperature, the distance of which to the water dew point is relatively small and is below 25° C. Thereby, SO₂ is bound into the ash, so that the combustion waste gases become free of SO₂. (FIG. 1 )

30 Claims, 3 Drawing Sheets

METHOD AND APPARATUS FOR THE COMPLETE, DRY DESULPHURIZATION OF COMBUSTION WASTE GASES COMPRISING SO₂ AND DUST

BACKGROUND OF THE INVENTION

The present invention refers to a method for the complete, dry desulphurization of combustion flue gases comprising $SO_2$ and particles, as well as to an apparatus for carrying out the method.

The method especially refers to the complete and dry desulphurization of combustion flue gases of the combustion of coal, in particular the combustion of brown coal, in which fly ash is comprised in the combustion flue gas.

The method further refers to the desulphurization of $SO_2$ containing combustion flue gases of other combustibles which instead of fly ash contain particles which have comparable properties described below.

Dry desulphurization means that the desulphurization process takes place at such a temperature distance from the dew point of the combustion flue gases, that the equipment portions downstream of a combustor (dedusting equipment, chimney) can be operated without any occurrence of condensation.

For the complete desulphurization, only wet methods are known, in which the combustion flue gases are brought into contact with absorbing liquids, such as caustic potash solution. It is disadvantageous, however, that the combustion flue gases leave this step of the process completely or almost completely moistly saturated, which results in caking and corrosion of the downstream equipment portions, attempts being then made to eliminate such results by re-heating the combustion flue gases.

Dry desulphurization methods are also known, in which for example $CaCO_3$ is blown into the combustion chamber. It decays at approximately 900° C. to become CaO, which then partly reacts with $SO_2$ and $SO_3$. In this manner, desulphurization degrees of slightly above 80% could be achieved but not a complete desulphurization.

Desulphurization methods, in which the combustion flue gases together with fly ash and/or added absorbentia are cooled down to almost the dew point of the combustion flue gases, or in which the dew point is raised by adding water or steam, come closer to this object, see for example DE 32 40 373 or DE 33 32 928. There, especially the last portion of the cooling process of the smoke gases is effected by previously adding other cooled-off fly ash and/or absorbentia to the combustion flue gas, to cool it further down thereby. Therein, it is desired to achieve the cooling-down to less than 5° C. above the dew point, since only then desulphurization degrees of 90% and more could be achieved. A complete desulphurization by that method is not known up to now.

Another dry operating desulphurization method is described in the magazine ZKG 3/1990, pages 139-143. There, the $SO_2$ comprising combustion flue gases are passed through a fluid bed, which consists of $Ca(OH)_2$ and cement raw powder. The fluid bed is operated in close proximity of the dew point of water, especially at an operation temperature of about 65° C. with a dew point of between 58° and 61° C. Despite the high cost of equipment, energy and absorbentia consumption, the desulphurization is only achieved to a $SO_2$ contents of 423 mg/mn³. It is further disadvantageous that the proximity to the dew point causes cakings, and that the remaining $SO_2$ contents results in corrosions of the downstream portions of the equipment. By means of a further decrease in the distance to the dew point, which in this cases is only about 65°–61°=4° C., the desulphurization can be slightly improved, however the problems concerning caking and corrosion are increasing. A complete and dry desulphurization by means of this method is also impossible.

SUMMARY OF THE INVENTION

Complete and dry desulphurization, however, can be achieved by means of the method according to the present invention, which will now be described with the aid of the example of desulphurization of the combustion flue gases of the combustion of pulverized brown coal from the region of the river Rhine.

This combustible is known from literature. Its ash usually comprises 30 to 50% Ca and Mg compounds, which in combustion calcinate to a large extent to become CaO and MgO and which in the above manner bind $SO_2$ and $SO_3$. It is known, that by means of this method desulphurization degrees of 20 to 50% are already achieved. Comparable kinds of brown coal are for example known from Saxonia, Hungary and countries outside Europe. The method according to the present invention can especially carried out very easily with pulverized brown coal from these countries. This method shall be described by means of the above example of the combustion of pulverized brown coal dust from the region of the river Rhine.

The pulverized brown coal dust is burnt in a manner, that its heating-up speed exceeds the critical value of 3000° C./sec and that it reaches a temperature of at least 900° C., preferably 1200° C. Thereby, all components of the ash particles which are produced by the combustion will be strongly surface-activated, which according to the heating speed lasts up to 10 sec and then slowly decreases. The higher the heating speed, the higher the surface activity. The best values are achieved at heating speeds of beyond 5000° C./sec. The ash particles have the highest receptivity as soon as their temperature has exceeded 1200° C., but have not become so hot that $Fe_2O_3$ or impurities of the ash melt, which can easily be recognized when looking at the ash particles under a microscope.

The flue gases of the combustion are then cooled down e.g. in a boiler in a known manner. Normally, the temperature is kept down at 130° C. to 150° C. in consideration of the dedusting equipment, feed-water temperatures and chimney.

According to the invention the flue gases are then further cooled down to a temperature distance from the water dew point of the combustion flue gases, which will be defined later, with the temperature distance depending on how long the combustion flue gases and the fly ash particles contained therein are kept at a temperature of less than 25° C. above the water dew point. With a residence time in this temperature range of 0.8–1.0 sec, the combustion flue gases have to be cooled down to less than 25° C. above dew point. The shorter the residence time in the stated temperature range, the more the required distance from the dew point decreases to which the flue gases have to be cooled down. In case of a residence time of 0.05–0.1 sec in the stated temperature range, the combustion flue gases have to be cooled down to a temperature of 11° C. above the dew point, whereas intermediate values can be interpolated linearly.

If the temperature difference from the dew point falls to less than 35° to 40° C., a fast bonding of the $SO_2$ takes place; $SO_3$, eventually present, is already absorbed and does not play a role anymore. In case the distance to the dew point is less than 10° to 25° C.—according to the residence time in the previously mentioned temperature range—the $SO_2$ is quantitatively bounded. Thus, a complete desulphurization is achieved.

The beginning of the sulphur bonding can be recognized by the color of the combustion ash. This color is, typical for pulverized brown coal from the region of the river Rhine, normally yellowish or ocherish with variations of brown. With the beginning of sulphur bonding, the ash becomes green. If such a boiler, or a combustion flue gas cooler which follows such a boiler, is inspected, normally a light deposit of dust is found on all surfaces. As long as this deposit still is yellowish, ocherish or brownish, no major bonding exceeding the previously mentioned primary bonding of the $SO_2$ has taken place. The beginning of the $SO_2$ bonding can be recognized by the initial occurrence of green ash.

There, a certain amount of $SO_2$ is chemically bounded; the greenish color of the ash points to an iron compound. If such ash is stored in a closed container for a few hours and if this container is then opened, a light, typically pungent odor of $SO_2$ can be recognized. Obviously a purely physical surface absorption has additionally taken place, which will probably slightly decrease in the course of time. After heating the ash up to 250° C. to 300° C., an exothermic reaction of the ash with the ambient air under $O_2$ consumption takes place, and afterwards the ash acquires its known yellowish-ocherish-brownish color again. Also in this case a slight $SO_2$ odor can be recognized.

The influence of the residence time suggests, that in case of the bonding of the $SO_2$, the fine ash particles are especially effective. The longer the residence time, the higher the possibility for the bigger ash particles to react.

The method according to the invention is also applicable for other $SO_2$ comprising combustion flue gases, which do not comprise solids components which can be compared to the components of the Rhine brown coal. To those, such fine grained solids could be added during combustion, while the requirements of surface activation according to the invention must be fulfilled.

Principally, the method can be carried out with all devices of the prior art, which fulfill the requirements of the method. As an example thereof, a device will now be described by means of which the conditions of the method can be met with particular benefit.

BRIEF DESCRIPTION OF THE DRAWINGS

The invention is further explained in detail with reference to the accompanying drawings in which.

DETAILED DESCRIPTION OF PREFERRED EMBODIMENTS

Figure 1:
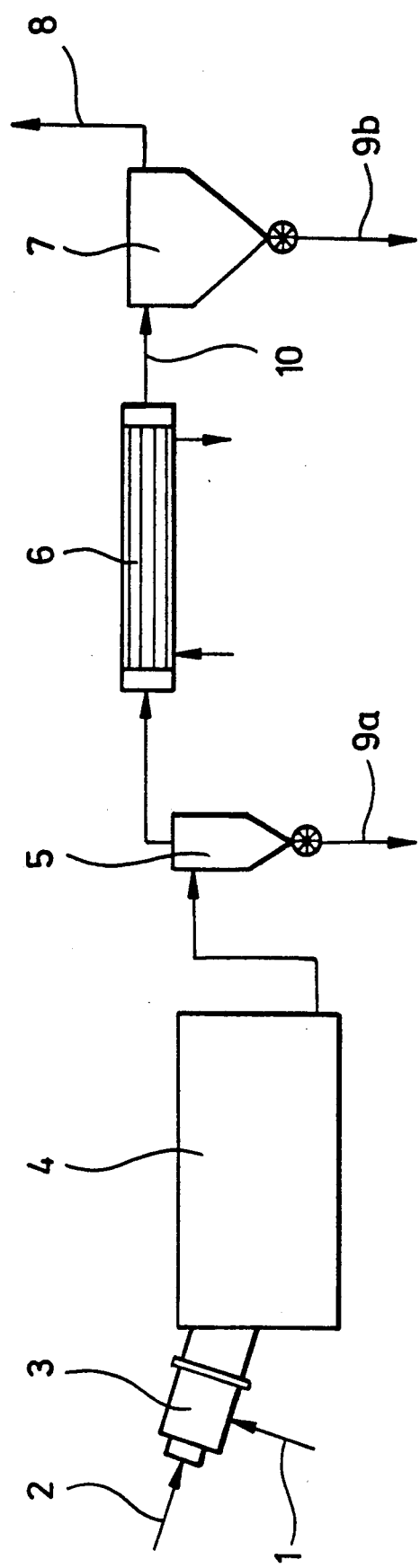
FIG. 1 is a schematic view of an installation for carrying out the method of the invention.

FIG. 1 shows the scheme of the method. Combustion air as well as the pulverized coal entrained by the carrier air are supplied to the burner 3 in a known manner. This burner heats the boiler 4. It can be effective to connect a cyclone separator 5 for oversized particles downstream to the boiler 4. It is followed by a cooler 6, which is provided with inlets and outlets for the cooling medium. According to the invention, the cooling medium is adjusted in a known manner in a way that the combustion flue gas facing surfaces of the heat transfer surface have a temperature between the dew point and the temperature below which the $SO_2$ is absorbed. The cooler 6 can especially be formed as a tube cooler, in which the combustion flue gases are flowing through the tubes which are kept at the desired temperature by means of water cooling them from the outside. A fine dedusting device 7 follows the cooler 6 in a known manner, e.g. a cloth filter. The filtered combustion flue gases leave the fine dedusting device 7 via the exhaust pipe 8.

The amounts of ashes leave the installation via the outlet devices 9a and 9b.

The tube volume of the cooler 6 exposed to the combustion flue gases, the connection tube 10 between the cooler 6 and the fine dedusting device 7 as well as the volume of the latter exposed to the particles containing gas determine the residence time of the combustion flue gases together with at least the finest particles of ash in the temperature range in which bonding of the $SO_2$ takes place. The residence time is determined in the known manner by the volume flow of the combustion flue gas and the above-mentioned volume.

It is in accordance with the prior art to maintain all surfaces contacted by combustion flue gases and ash at a temperature above the dew point of the combustion waste gas.

The presence of the cyclone dedusting device 5 is not essential for the process. It can be useful to separate eventually still burning oversized particles from the pulverized coal. Its separation capacity, however, has to be limited according to the known rules for cyclone dedusting devices in a way that a sufficient amount of fine ash is present in its outlet. The sufficient amount of ash is defined by the fact that, while all conditions of the process are fulfilled, with an insufficient amount of fine ash the bonding of the $SO_2$ is not complete anymore.

Figure 2:
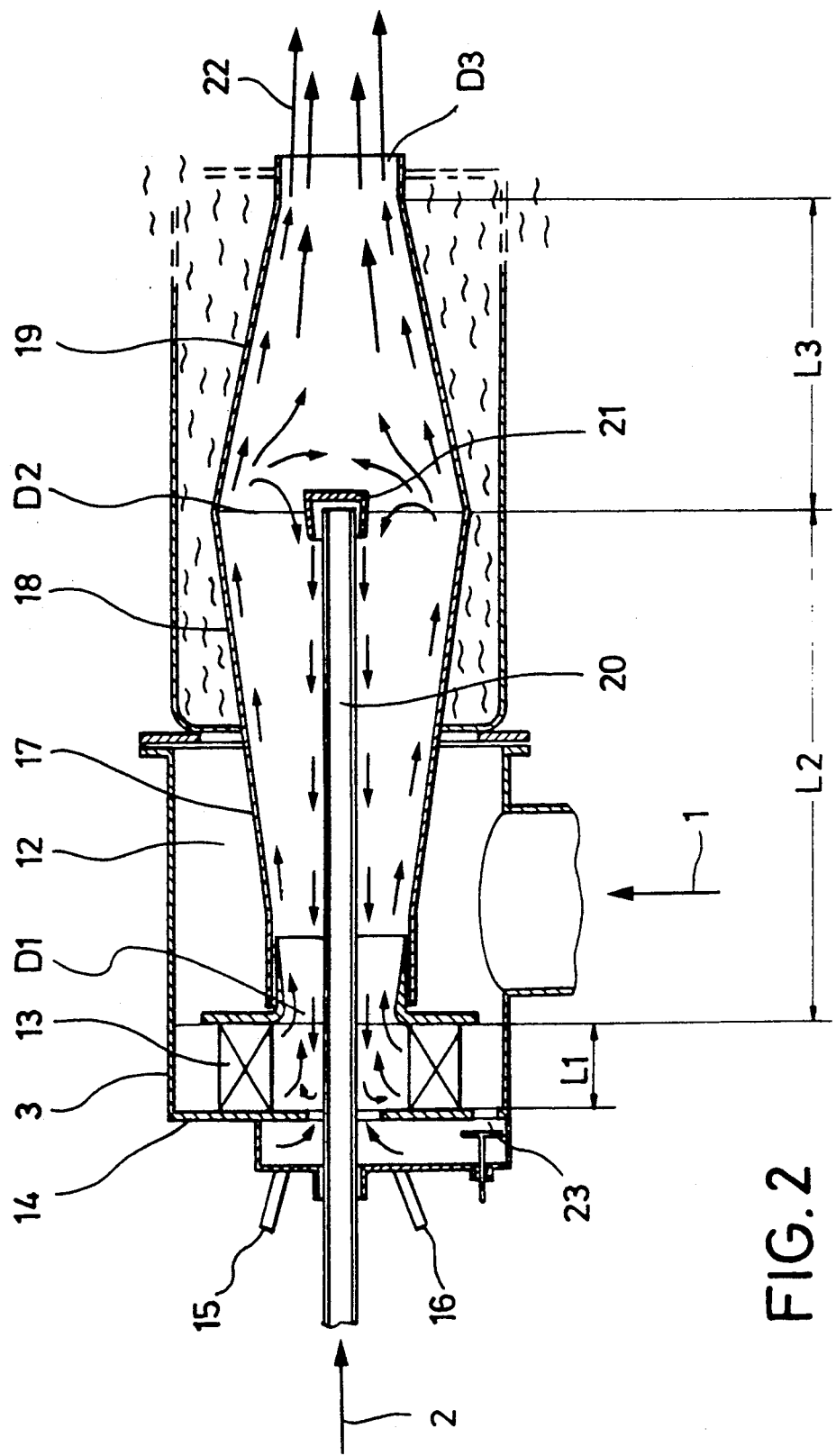
FIG. 2 is a sectional side view of a burner used in the method of the invention.

Important for the process is the achievement of a sufficiently high heating speed of the coal particles before and after the combustion. The respective text books of the firing technology provide rules for achieving the desired heating speeds or residence times. Usually these text books do not talk about residence times but about combustion chamber loads. These are inversely proportional to the residence times. Combinations of high capacity burners and additional combustion chambers usually called combustors are especially suitable as long as these devices meet the practical demands of the pulverized coal combustion. This is preferably the case in the burner shown in FIG. 2. The principal structure of the burner of the type shown in FIG. 2 is disclosed in U.S. Pat. No. 4,057,021 to Schoppe. The burner is supplied with combustion air 1 as well as coal dust entrained by the carrier air in a known manner. The flow of the combustion air 1 is homogenized in a collector compartment 12 and is then swirled in an inlet portion by means of a radial vane arrangement 13 disposed therein and having an axial length L1. Swirling, the combustion air 1 enters into a divergent combustion muffle 17 having an inlet diameter D1 to which a downstream, water-cooled portion 18 adjoins, the combination of the combustion muffle and of the water-cooled portion having an axial length L2. A flame accelerating nozzle 19 having an axial length L3 and an outlet diameter D3 is connected with this water-cooler portion 18 downstream thereof. An axially extending pulverized coal lance is inserted into the combustion muffle, said coal dust lance having a reversing cap 21 at the free end thereof and ending at the portion of largest diameter D2 of the water-cooled portion 18 where the accelerator nozzle 19 is connected.

For a combustion capacity of 3.9 MW, the dimensions shown in the following table are used according to the invention:

| | |
|---|---|
| D1 = | 338 mm ⌀ |
| D2 = | 700 mm ⌀ |
| D3 = | 350 mm ⌀ |
| L1 = | 197 mm |
| L2 = | 1470 mm |
| L3 = | 850 mm |

The guide vanes 13 are preferably formed as a logarithmical spiral, having a spiral angle with respect to the circumferential direction between 6° and 12°, preferably 10°.

With these dimensions selected, a directed flow is obtained in the combustion muffle, shown in FIG. 2, with only the downstream components being shown. These are superimposed by a circumferential component in a way that a flow angle of about 45° with respect to the generating line results at the outer periphery.

In the selection of the stated dimensions, two groups of results are achieved:

a) Flame stability

A wall-near downstream flow extends from diameter D1 to diameter D2. There, about half of the flow amount turns radially inwardly and runs along the lance 20 through the cross section of diameter D1 back to the region of the guide vanes 13. Here, this flow turns radially outwardly again and flows towards the diameter D2 together with the fresh air downstream. Between the throughput flow and the back flow a zone of very intensive turbulence is formed, in which the flame stabilizes.

The pulverized coal 2 is injected with a preferably constant amount of carrier air and is blown into the back flow by the aid of the reversing cap 21.

Under the irradiation of the surrounding flame, the volatile components of the pulverized coal vaporize and form, together with the combustion air, a gaseous flame which together with the remaining pulverized coal burns out in a flame jet 22. Under the stated conditions, the jet attains a speed of about 100 m/sec, which is essential for keeping clean the combustion chamber connected downstream.

b) Emissions

The stated dimensions and operational data result in combustion flue gas emissions which are clearly below the limit of the TA Luft, a German technical direction concerning the purity of emissions into air.

Figure 3:
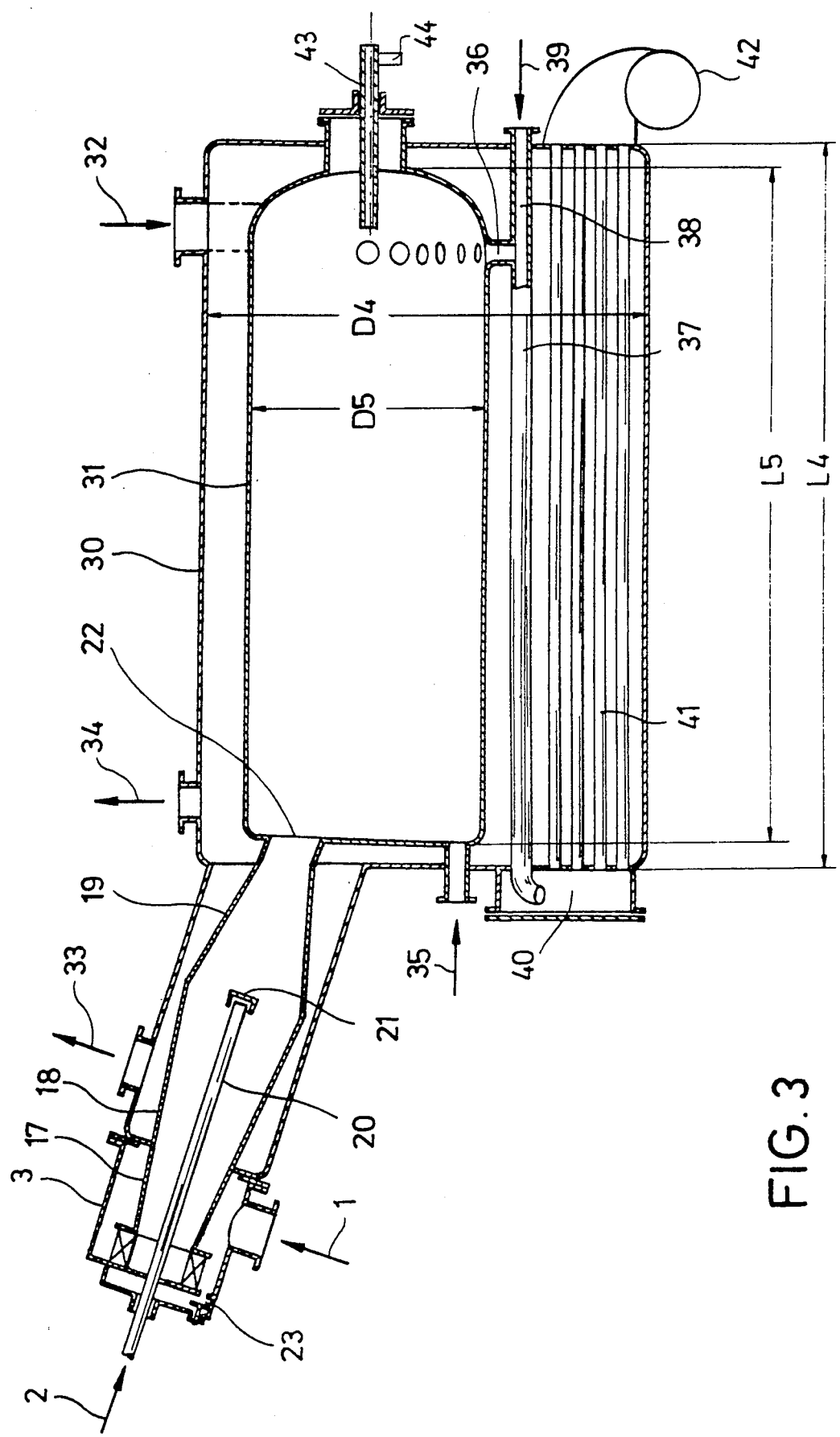
FIG. 3 is a sectional side view of a burner of FIG. 2, a boiler heated by the burner, and a cooler for cooling the flue gases leaving the vessel.

FIG. 3 shows a boiler which is suitable for carrying out the method according to the invention, said boiler being a hot water boiler in the present case.

The boiler body 30 having the diameter D4 and the length L4 comprises fire tube 31 having the diameter D5 and an inlet 32 for the cold back water as well as an outlet 33 and an outlet 34 for the heated flow water. Thereby, the water cooling of the combustion muffle shown in FIG. 2 is ensured. This combustion muffle is arranged in the upper region of the front side of the fire tube 31 and blows its flame jet angularly downwards onto the other end of the fire tube, in which in the lower region the inlets 36 into the first tube pass 37 are arranged.

Below the burner at least one blowing nozzle 35 is arranged, through which up to 15% of the combustion throughput air can be blown into the fire tube, in order to support the combustion, as well as to blow away ash deposits. The blowing nozzle 35 can be combined with blowing devices for pressurized air or vapor, if impurities in the pulverized coal lead to deposits in the fire tube.

With the above measures one can keep the fire tube clean, which is advantageous for the method of the invention, since in this way controllable temperature conditions are present. Deposits of ash or slag in the fire tube would disrupt the heat transfer and would alter the temperature.

Since the combustion of pulverized coal continues into the first tube pass 37, it is advantageous to provide each individual tube of this tube pass with blowing nozzles, through which an additional amount of air 39 of up to 15% of the amount of combustion air can be blown into the tubes of the tube pass 37. These air jets also keep the inlet regions of the first tube pass 37 clean.

For the stated boiler capacity of about 3.5 MW corresponding to the combustion capacity of 3.9 MW, it is furthermore advantageous for the method according to the invention to provide 25 tubes for the first tube pass, each tube having a diameter of 88.9×5 mm. This results in sufficiently high speed to also avoid ash deposits in the tubes of the first tube pass 37 when operating at reduced load. On the other hand the speeds are still not so high when operating in the upper load range of the boiler dynamic effects due to the combined effects of the gases in the tubes with the elasticity of the gas volume in the fire tube 31 would result. If the velocity of the combustion flue gases in the tubes of the first tube pass 37 is lower than a sufficiently high minimum velocity, ash deposits would form in the tubes, which move like dunes through the tubes and lead to a pressure pulse each time they reach the end of the tube, which results in that a precise adjustment of the amount of combustion air will become difficult.

By means of the above-mentioned dimensioning of the tubes of the first tube pass 37 only a limited cooling of the combustion flue gases to about 500° C. is made with the result that the combustion reactions still taking place in the tube pass have sufficient time and temperature level to complete. Ash properties resulting therefrom are advantageous for the method of the invention.

In the front reversing chamber 40 the combustion flue gases cooled down to a temperature of about 500° C. are supplied to the tubes 42 of a second tube pass, in which they are cooled down in the lower region of the boiler to temperatures of about 110° to 150° C. dependent on the boiler load and water temperature.

Considering the above-mentioned conditions, i.e. the ash transport on one hand and the avoidance of dynamical effects on the other hand, it is advantageous for the method of the invention to provide 288 tubes in the second tube pass having each a diameter of 30×5 mm.

The cooled down combustion flue gases leaving the tubes 41 are supplied to a flue gas exit tube 42. This tube is arranged in an advantageous manner transversely to the axis of the boiler, with the combustion flue gases being supplied to the tube tangentially. In this manner it is achieved that throughout the entire length of the flue gas exit tube 42 dead flow zones do not occur anywhere which could lead to ash deposits.

The arrangement with burner, fire tube, the individual tube passes and the flue gas exit tube, shown entirely in FIG. 3, thus has a self-cleaning effect and keeps itself completely clean during operation. This is of great advantage for the method of the invention, since thereby the entire ash is in the combustion flue gas and is of a reproduceable configuration.

The device shown in FIG. 3 is also suitable with the same capacity and almost the same efficiency also for the combustion of other pulverized combustibles, like e.g. pulverized hard coal, wood and the like and also for the combustion of liquid and gaseous combustibles.

For the application of the method of the invention for the desulphurization of combustion flue gases of liquid fuels absorbients, e.g. pulverized limestone, must be blown into the combustion muffle in the known manner, with the amount and processing depends on the respective rules of the prior art.

A remarkable property of the device shown in FIG. 3, especially in the combustion muffle and the fire tube, is that the flow conditions therein do not depend on the Reynolds number in the first approximation. That means, that in converting to other firing capacities the dimensions of muffle and fire tube have to be converted with the root of the capacity ratio. It has to be considered, that burner systems according to FIG. 2 do not have an upper capacity limit; however, such limit is given by the processing and reactivity of the respective combustible. With an increasing capacity, higher flame speeds can thus be obtained in the known manner, with the devices becoming somewhat smaller than would result from the computation with the square root of the capacity ratio. This consideration corresponds to the prior art.

The first tube pass 37 and the second tube pass 41 are operating in the ranges of the Reynolds numbers, in which the decrease in temperature is only a function of the ratio of the length to the inner diameter of the respective tubes. If in conversion to other capacities the same combustion flue gas temperature at the outlet of the boiler is to be obtained, the sum of the tube cross sections is converted corresponding to the capacity ratio in the known manner, with the sum of the ratios of tube length to the inner diameter remaining constant. Thus the dimension and number of tubes of the respective tube pass are clearly defined according to the rules of the fluid technics. Further statements on dimensions therefor are not necessary.

If the device described in FIG. 3 should also fulfill the other limits of the TA Luft, especially with respect to $NO_x$ and CO, it is of advantage to select the following values for the diameter D5 of the fire tube 31 and of its length L5:

D5 = 1400 mm ⌀

L5 = 3850 mm.

Therefrom, a diameter of the boiler 30 of D4 = 2600 mm and a length of the boiler of L4 = 4100 mm results.

As mentioned in the beginning portion of this specification, the dew point may be raised by adding water or steam t the flue gases. In some instances, it may be necessary in the method of the invention to raise the dew point of the flue gases so as to establish a proper temperature difference from the dew point, as explained above. A preferred location for injecting water or steam into the flue gases is situated in the fire tube 31 opposite to the burner, and may be performed by means of an injector 43 arranged in the axis of the fire tube 31 and supplied via an inlet 44. It is preferred that the water or steam is finely dispersed by injector 43 within the fire tube.

We claim:

1. A method for the complete, dry desulphurization of combustion gases containing $SO_2$ and fly ash and resulting from the combustion of pulverized coal and other combustibles containing ash, comprising the following steps:
    a) activation of the fly ash by heating up the pulverized coal and any other combustibles containing the ash during the combustion with a heating up speed of more than 3000° C./sec up to a temperature of more than 900° C., but below the ash sintering temperature developing during a residence time within a flame,
    b) cooling the combustion flue gases to a temperature distant from the water dew point, with the admissible highest value of the temperature distance being dependent on the residence time of the combustion flue gases between the termination of the cooling process and the time of seperation of a fine grain portion of the ash, as follows:
       in case of a residence time of 0.8 sec, the temperature distance is 25° C. maximum,
       in case of a residence time of 0.1 sec, the temperature distance is 11° C. maximum, and
       between the residence times of 0.8 and 0.1 sec, the temperature distance is linearly interpolated between said maximums.

2. A method as set forth in claim 1, wherein the heating up speed is more than 5000° C./sec.

3. A method as set forth in claim 1 or 2, wherein the pulverized coal is heated up to a temperature of more than 1200° C.

4. A method for the complete, dry desulphurization of combustion flue gases containing $SO_2$ and resulting from the combustion of combustibles which do not contain ash or whose ash amount is low wherein absorbents suitable for the method are blown into a flame in pulverized form such that:
    a) absorbent particles are activated during the combustion process by heating up during the combustion with a heating up speed of more than 3000° C. sec up to a temperature of more than 900° C., but below the sintering temperature developing during the residence time within of the absorbents and the ash, respectively, within the flame,
    b) cooling the combustion flue gases to a temperature distant from the water dew point, with the admissible highest value of the temperature distance being dependent on the residence time of the combustion flue gases between the termination of the cooling process and the time of seperation of the finest grain portion of the particles, as follows:

in case of a residence time of 0.8 sec, the temperature distance is 25° C. maximum,
in case of a residence time of 0.1 sec, the temperature distance is 11° C. maximum, and
between the residence times of 0.8 and 0.1 sec, the temperature distance is interpolated linearly between said maximums.

5. A method as set forth in claim 4, wherein the particles are heated with a heating up speed of more than 5000° C./sec.

6. A method as set forth in claim 4, wherein the particles are heated up to a temperature of more than 1200° C.

7. A method as set forth in claim 1 or 4, wherein a required undershooting of the admissible temperature distance to the water dew point is attained in that the combustion flue gases are cooled down to the water dew point resulting from the combustion and the atmospherical moisture by contacting the gases with cooler surfaces.

8. A method as set forth in claim 1 or 4, wherein water or steam is added to the combustion flue gases to increase their dew point.

9. A method as set forth in claim 1 or 4, wherein the combustion and the heating up effected thereby of the particles of the combustion ash and of added combustibles, respectively, is carried out in a burner muffle, which fires a heat receiving chamber.

10. A method as set forth in claim 9, wherein the heat receiving chamber is a radiation compartment of a boiler.

11. A method as set forth in claim 9, wherein the combustion flue gases flow through the heat receiving chamber and through flues of a boiler and thereby cool down.

12. A method as set forth in claim 10, wherein downstream of the boiler a cooler is connected which cools the combustion flue gases at least to the said temperature distant to the water dew point.

13. A method as set forth in claim 12, wherein the cooler is operated in a way that the temperature of heat receiving surfaces thereof exposed to flue gas of the combustion is higher than the water dew point of the combustion flue gases flowing therethrough.

14. An apparatus for the combustion of pulverized coal and other combustibles containing ash and for the desulpherization of combustion gases resulting from the combustion, comprising:
a divergent burner muffle having an inlet portion and a downstream convergent flame accelerator nozzle, said burner muffle having, for a firing capacity of 3.9 MW, the following dimensions:

| | | |
|---|---|---|
| diameter at the inlet of the muffle | $D1 =$ | 338 mm |
| diameter at the inlet of the accelerator nozzle | $D2 =$ | 700 mm |
| diameter at the outlet of the accelerator nozzle | $D3 =$ | 350 mm |
| axial length of the inlet portion | $L1 =$ | 197 mm |
| axial length of the muffle | $L2 =$ | 1470 mm | with radial guide vanes being arranged upstream of the inlet which supply the combustion air at a spiral angle with respect to the circumferential direction of 6° to 12°.

15. An apparatus as set forth in claim 14, wherein a fire tube is connected downstream to the burner, with said firing capacity of 3.9 MW said fire tube having the following dimensions:

diameter of the fire tube $D5 = 1400$ mm
length of the fire tube $L5 = 3580$ mm.

16. An apparatus as set forth in claim 14, wherein a rectangular firing chamber is connected downstream of the burner and having a length of 3580 mm and a hydraulic diameter of 1400 mm.

17. An apparatus as set forth in claim 14 or 15, wherein for the calculation of the apparatus dimensioned for firing capacities other than 3.9 MW the above dimensions are calculated with the square root of the ratio of the firing capacities, with the angle of the air guide vanes being kept constant.

18. An apparatus as set forth in claim 14 or 15, wherein at a front side of the flame nozzle below the burner at least one opening is disposed, the blow-out cross-section thereof being dimensioned such that through the opening up to 15% of the combustion air can be blown into the flame nozzle, by means of which the combustion is supported and deposited ash particles are blown away.

19. An apparatus as set forth in claim 14 or 15, wherein at a front side of the flame nozzle underneath the burner a plurality of openings are provided through which steam or pressurized air can continuously or pulsatingly be blown into the flame nozzle for removal of deposits from the lower region of the flame nozzle.

20. An apparatus as set forth in claim 14 or 15, wherein the combustion flue gas outlets of the flame nozzle are located at the end thereof opposite the burner.

21. An apparatus as set forth in claim 14 or 15, wherein the combustion flue gas outlets of the flame nozzle are formed as openings in the lower regions of the flame nozzle which are connected to the tubes of a downstream connected first tube pass.

22. An apparatus as set forth in claim 21, wherein blow-in openings are assigned to the tubes of the first tube pass, the cross-sections of which are dimensioned such that up to 15% of the combustion air can be blown through the blow-in openings into the tubes of the first tube pass.

23. An apparatus as set forth in claim 21, wherein with a firing capacity of 3.9 MW the first tube pass consists of 25 tubes each having the cross-sectional dimensions of 88.5×5 mm.

24. An apparatus as set forth in claim 21, comprising a second tube pass connected downstream of the first tube pass and consisting of 288 tubes each having the cross-section dimensions of 30×5 mm.

25. An apparatus as set forth in claim 24, wherein for firing capacities other than 3.9 MW the sum of the tube cross-sections of the tube passes is calculated proportional to the firing capacity, in which for maintaining the combustion flue gas temperature at the boiler outlet the sum of the ratio of the tube length to their clear diameter is dept constant.

26. An apparatus as set forth in claim 22 wherein with a firing capacity of 3.9 MW the first tube pass consists of 25 tubes each having the cross-sectional dimensions of 88.5×5 mm.

27. An apparatus as set forth in claim 22 comprising a second tube pass connected downstream of the first tube pass and consisting of 288 tubes each having the cross-section dimensions of 30×5 mm.

28. An apparatus as set forth in claim 27, wherein for firing capacities other than 3.9 MW the sum of the tube cross-sections of the tube passes is calculated proportional to the firing capacity, in which for maintaining the combustion flue gas temperature at the boiler outlet the sum of the ratio of the tube length to their clear diameter is kept constant.

29. An apparatus as set forth in claim 14 or 15 wherein the guide vanes are formed in accordance with a logarithmical spiral.

30. An apparatus as set forth in claim 14 or 15 wherein the spiral angle is from 8° to 10°.

* * * * *

UNITED STATES PATENT AND TRADEMARK OFFICE
CERTIFICATE OF CORRECTION

PATENT NO. : 5,317,979
DATED : June 7, 1994
INVENTOR(S) : Fritz Schoppe, Josef Prostler It is certified that error appears in the above-indentified patent and that said Letters Patent is hereby corrected as shown below:

Column 4, line 62, starting at "The principal structure" should read as a new paragraph.

Column 7, line 24, "flue gases of liquid" should read --flue gases, of liquid--.

Column 7, line 35, "with the root of the" should read --with the square root of the--.

Column 8, line 5, "t the flue gases." should read --to the flue gases.--.

Column 8, line 35, "time of seperation" should read --time of separation--.

Column 9, line 47, "desulpherization of combustion" should read --desulphurization of combustion--.

Column 10, line 49, "cross-section dimensions" should read --cross-sectional dimensions--.

UNITED STATES PATENT AND TRADEMARK OFFICE
CERTIFICATE OF CORRECTION

PATENT NO. : 5,317,979
DATED : June 7, 1994
INVENTOR(S) : Fritz Schoppe
Josef Prostler It is certified that error appears in the above-indentified patent and that said Letters Patent is hereby corrected as shown below:

Column 10, line 56, "is dept constant." should read --is kept constant.--.

Column 10, line 64, "cross-section dimensions" should read --cross-sectional dimensions--.

Signed and Sealed this

Sixth Day of December, 1994

Attest:

BRUCE LEHMAN

Attesting Officer  Commissioner of Patents and Trademarks